Feb. 24, 1942.  M. B. ORNSTEIN  2,274,303
INTERCHANGEABLE FIGURE STRUCTURE
Filed Dec. 12, 1940
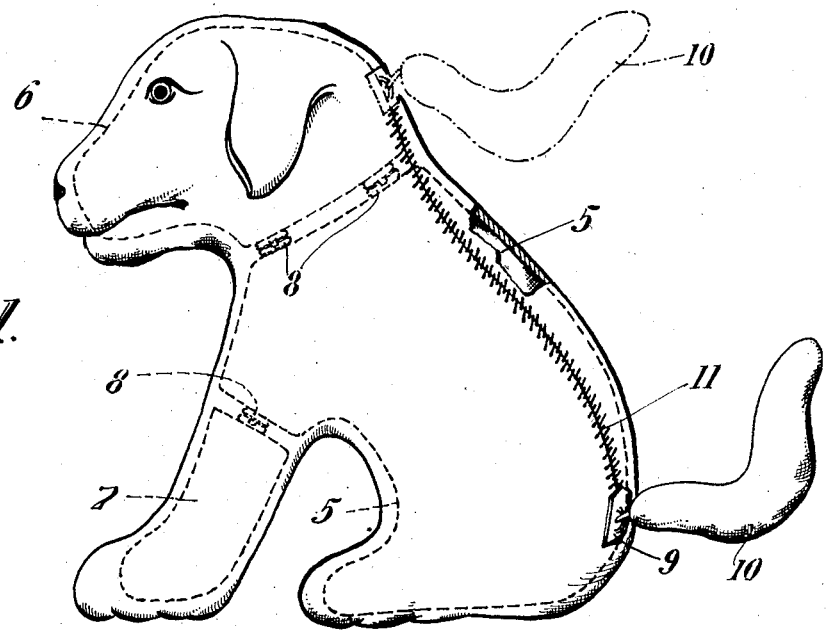
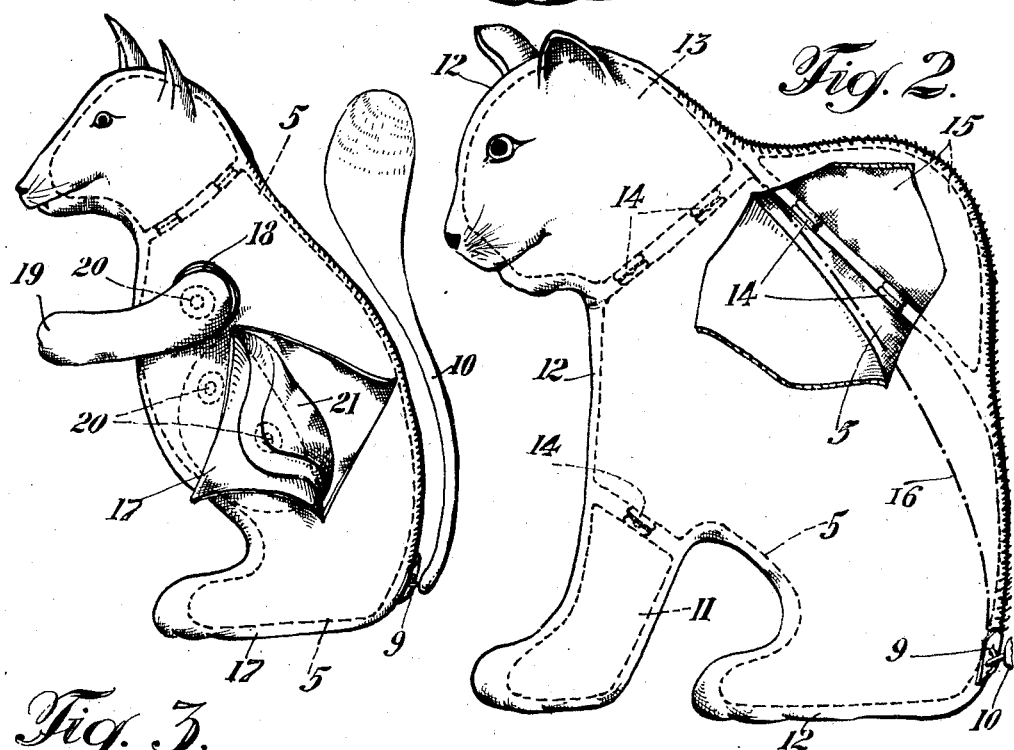
INVENTOR.
Martha Brunner Ornstein
BY
Att'y.

Patented Feb. 24, 1942

2,274,303

UNITED STATES PATENT OFFICE 2,274,303

INTERCHANGEABLE FIGURE STRUCTURE

Martha Brunner Ornstein, New York, N. Y.

Application December 12, 1940, Serial No. 369,769

6 Claims. (Cl. 46—158)

This invention relates to dolls or other figure structures having either educational or play appeal, and particularly concerns a device of this category adapted to be readily transformed into figures representing different beings of various shapes, colors, forms and configurations.

Cognizance is taken of certain known devices of this class, particularly of the type wherein a basic body portion was adapted to be enveloped by interchangeable outer coverings simulating various animals. Although these toys enabled changes to be made so as to simulate different animals, the fact that a single unitary and complete basic body was always employed resulted, at times, in a rather unconvincing and distorted resemblance. It is primarily within the contemplation of my invention to eliminate this shortcoming in devices of the said category by providing means to change the configuration of the basic body portion to accurately resemble various predetermined animals or other beings, so that upon the application of a suitable cover showing the outer appearance of the intended being a realistic resemblance could be obtained.

It is a further object of this invention to enable not only the accurate simulation of several selected animals or other beings, but also to permit the shape, position or configuration of any single selected form to be modified so as to enhance the value of the device either as a play or educational toy, and permit its use for enabling a child to learn various anatomical structures. This I accomplish by employing a specially designed basic inner portion adapted to receive at various portions thereof pads or fillers of material, so as to produce, for example, an arched back in a figure of a cat, or stout and thin proportioned forms of any selected figure. And in this aspect of my invention it is a further object to permit the insertion, within one outer covering, of other complete figures, so as to present, for example Jonah within the whale, and produce other examples of biblical, legendary or story book creations.

Another object is to enable a single outer covering to be applied to a basic form with several different inner pads or figures, an objective which I accomplish by employing a cover of yieldable or resilient properties.

It is further within the contemplation of this invention to enable the various parts adapted to be operatively associated with the basic figure to be easily attached and detached, so that the device may be readily manipulated by a child.

Another object of this invention is to provide a device in the category aforesaid of simple construction and one that can be readily fabricated.

Other objects, features and advantages will appear from the drawings and description hereinafter given.

Referring to the drawing,

Figure 1 is a side elevation of a figure of a dog made in accordance with my invention, a part being broken away to show the inner filler, the dot-dash lines showing the slide fastener with tail attached, in its uppermost and open position.

Figure 2 is a view of another figure containing the same basic form as Figure 1, but with a resilient outer covering simulating a cat, and containing a differently shaped head portion and a pad attached to the basic form to produce an arched back, the dot-dash lines indicating another position of the resilient cover when applied over a differently shaped inner portion, and Figure 3 is a view of another figure formed from the same basic form as Figure 1, the covering, however, containing apertures therein to accommodate limbs operatively attached to the said basic form, a portion of the outer covering being open to show the attachment of a pad thereto.

In the drawing, the basic form 5 is of such predetermined shape as to be adaptable for use with various types and forms of figures. Detachably secured to said basic form 5 are certain other body portions such as the head 6 and limbs 7. In the preferred form of my invention, I employ snap fasteners 8 to effect a detachable connection between the various inner portions, although it is of course understood that any other means of attachment may be employed within the scope and intent of this invention, the particular method shown being merely for illustrative purposes. In inserting the properly assembled inner form, the slide member 9, to which the tail 10 is preferably attached, is in the uppermost position as shown by dot-dash lines in Figure 1, whereby the sides of the closure 11 are separated to permit the inner portions to be inserted. Thereafter the said slide fastener is drawn down to the lowermost position, whereby the assembly is complete. It is of course understood that instead of the conventional slide fastener arrangement shown in the drawing, any other closure means may be employed with equal force and effect.

Should it be desired to employ the same basic inner form 5 to produce, for example, the figure of a cat, an outer covering 12 (Figure 2) in the form of a cat is employed, together with limbs 11 and head 13 shaped to resemble the corresponding parts of the cat. Attached to the form 5 by suitable fastening means such as the snap fasteners 14 is the pad 15 to give to the cat an arched or raised back. It is of course understood that other pads may be employed secured to different parts of the basic form so as to produce different predetermined effects.

I prefer to employ a yieldable or elastic material for the outer covering. In the preferred form of my invention, the outer covering, such as that designated by the reference numeral 12, is of an elastic or yieldable material, such as rubber or knitted fabric. This will enable a single outer covering to be applied over the inner form with different pads or fillers thereon, the cover yieldably adjusting itself to conform with the inner portions. Thus, by referring to Figure 2, it will be seen that if the pad 15 were removed and a slightly different inner portion used, the outer covering 12 would conform to the new inner configuration by assuming the position indicated by the dot-dash line 16.

In Figure 3 the same inner basic form 5 is employed with an outer covering 17 containing apertures 18 therein adapted to receive therethrough the limbs 19, the innermost portion of said limbs being detachably secured to the body portion by snap fasteners 20 or any other suitable means. In this manner it is obvious that various types of limbs can be readily attached, not only to correspond to different animals, but if preferred, to the same animal having differently formed appendages. In the same manner apertures can be provided to accommodate detachable heads and other portions of the body.

In Figure 3 the outer covering 17 has attached to it the pads 21, thereby increasing the dimensional proportions of the animals. As will be observed, the pads are here attached not to the inner body portion as shown in Figure 2, but to the outer covering proper, the attachment being effected in any suitable manner, such as by snap fasteners, stitching or otherwise.

It is thus apparent that by means of the invention hereinabove described a single basic body form can be employed for various types of animals, body portions such as heads, limbs, etc., being detachably secured to said basic form so as to more realistically correspond to the animal being simulated. And by employing inner pads in cooperable relation with said basic form, the animal can be made to appear stout or thin, or if desired, distorted in any predetermined manner. Of course, instead of employing elements intended to represent parts of the animal's body, other separate figures may be employed within the outer covering, so as to represent one animal swallowed within another, in accordance with fairy tales and legends. And the employment of a resilient outer covering adds further to the adaptability of my invention to its intended purpose of economically simulating various types and shapes of animals.

It is of course understood that the various embodiments above described and shown in the drawings are illustrative of my invention and not employed by way of limitation, inasmuch as numerous changes and modifications may be made within the scope of the appended claims without departing from the spirit of this invention.

What I claim is:

1. A figure structure comprising an inner basic form of predetermined configuration, supplementary pad members adapted for placement against selected portions of said basic form whereby the said configuration thereof may be modified, and an outer covering with predetermined external characteristics enveloping said basic form and the said supplementary members, said covering being provided with an apertured portion for inserting said basic form and supplementary members, and closure means associated with said apertured portion.

2. In a figure structure, an inner basic form of predetermined configuration, a pad member detachably secured to said basic form for changing the shape thereof, and an outer covering with predetermined external characteristics enveloping said basic form and the said pad member, said covering being provided with an apertured portion for inserting said basic form with said pad member, and closure means associated with said apertured portion.

3. A stuffed animal figure comprising an inner basic form of predetermined configuration, body portions detachably secured to said basic form, whereby the assembly of said body portions and basic form will simulate the shape and proportions of a predetermined animal, and an outer covering having the external characteristics of said predetermined animal and enveloping said basic form and attached body portions, said covering being provided with an apertured portion for inserting said basic form and attached body portions, and closure means associated with said apertured portion.

4. A stuffed animal figure according to claim 3, the outer covering being further provided with open portions to permit certain of said body portions to extend therethrough.

5. A stuffed animal figure comprising an inner basic form of predetermined configuration, supplementary pad members adapted for placement against selected portions of said basic form whereby the said configuration thereof may be modified, and an outer covering with predetermined external characteristics enveloping said basic form and the said supplementary members, said covering being provided with an apertured portion extending down the back of the figure to a predetermined lowermost point, slide fastener closure means operatively associated with said apertured portion and including a slide member in its closed position when at said lowermost point, and a tail member attached to said slide member and adapted for manual grasping to effect an upward opening movement of the slide member.

6. A figure structure comprising an inner basic form of predetermined configuration, supplementary members adapted for placement against selected portions of said basic form whereby the said configuration thereof may be modified, and an outer covering of resilient material adapted to yieldably envelope said basic form and the supplementary members thereagainst, said covering having predetermined external characteristics and being provided with an apertured portion for inserting said basic form and supplementary members, and closure means associated with said apertured portion.

MARTHA BRUNNER ORNSTEIN.